J. R. PENNINGTON.
MEDICAL APPARATUS.
APPLICATION FILED OCT. 12, 1914.
1,363,010.
Patented Dec. 21, 1920.
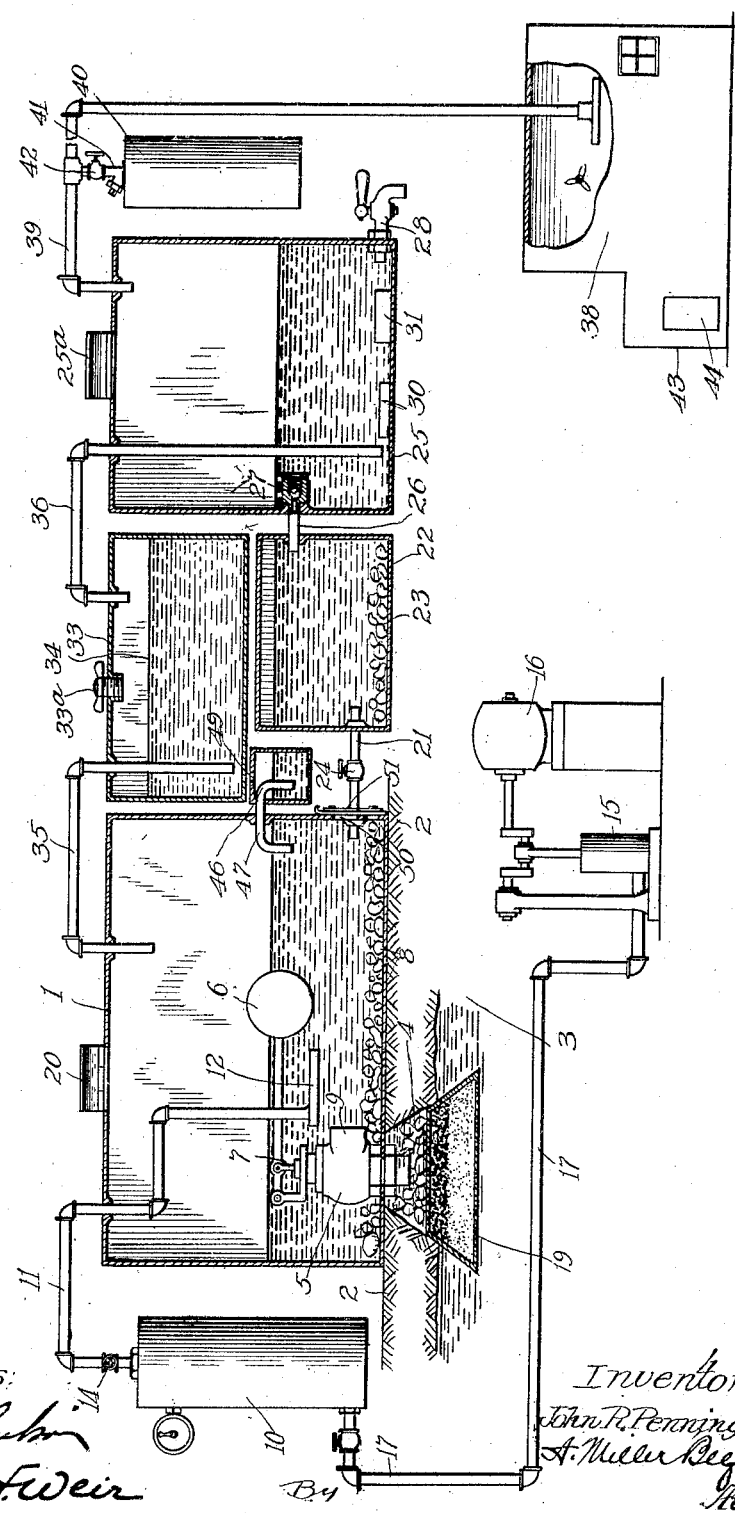

UNITED STATES PATENT OFFICE.

JOHN R. PENNINGTON, OF CHICAGO, ILLINOIS.

MEDICAL APPARATUS.

1,363,010.     Specification of Letters Patent.     Patented Dec. 21, 1920.

Application filed October 12, 1914. Serial No. 866,190.

*To all whom it may concern:*

Be it known that I, JOHN R. PENNINGTON, a citizen of the United States, residing at Chicago, in the county of Cook and State of Illinois, have invented a certain new and useful Improvement in Medical Apparatus, of which the following is a full, clear, concise and exact description, reference being had to the accompanying drawings, forming a part of this specification.

My invention relates to curative apparatus, and especially to apparatus adapted to obtain the benefits of the curative properties of radium or the like.

Prominent objects of the invention are to provide a practical apparatus of the class specified; to arrange for obtaining radium curative benefits both by inhalation and in liquid or other edible form; to maintain continual effectiveness, avoiding inefficiency by decay of the emanation, or for other reasons; to secure a high degree of efficiency and effectiveness at all times and in all parts of the apparatus; to secure convenience in treatment; and to secure the foregoing and other desirable results in a simple and expeditious manner.

In carrying out the invention in the manner hereinafter more particularly set forth, I arrange an apparatus in which a liquid, as for example water, is charged with radium emanation, the apparatus being so devised as to permit this liquid to be drawn off as desired for use for drinking or other purposes. The apparatus also provides purified air, or other gaseous substance capable of being inhaled, also charged with radium emanation, and this air or atmosphere is led to a convenient point where it may be inhaled at leisure and as long as desired. From either one or the other of these sources, radio activity may be secured, permitting the beneficial and curative effects of radium to be obtained.

As a matter of further improvement I arrange the apparatus in connection with a natural or flowing spring or stream, whereby a continuous flow of pure water is obtained, and this is controlled so as to insure a constant supply of liquid and air freshly charged with radium emanation.

In the accompanying drawings the figure represents an apparatus embodying my present invention.

The apparatus shown comprises a main receptacle or reservoir tank 1, which is to receive the liquid in the first instance. A highly desirable arrangement is to arrange this tank 1 in the neighborhood of a spring or flowing stream, as for example in or upon the earth near the spring or stream, as for example by locating said tank upon the ground 2 immediately above a spring 3. In such case the tank 1 has its bottom provided with an opening or aperture immediately above an opening 4 in the ground 2 whereby the spring water may flow upwardly from the spring into the tank 1. A valve arrangement 5 is desirably provided for automatically controlling the amount of water permitted to flow into the tank 1. This valve arrangement may be any form of automatically controlled inlet valve having a float 6 connected with the valve rod 7 which is understood to extend down to a valve which controls the orifice of the valve arrangement 5, whereby when the level of the water in the tank 1 has reached a predetermined level, the valve arrangement will close and prevent the further inlet of water, and also whereby upon the water's level descending, said valve will automatically open and permit water to enter, thereby to raise the level of water in a tank to its normal or desired level.

At the bottom of the tank 1 some radio active or other desirable substance or material 8 is located. This is preferably pitch blende urano-vanadate of potassium (carnotite) or the like. This ore or other material is conveniently placed upon the floor of the tank in suitable quantity, and charges the liquid within said tank with radium emanation, making said liquid radio-active.

I prefer also to provide means for agitating the liquid within the tank 1, so as to increase the radio activity. As an example of such apparatus I show a tank 10 which is understood to be supplied with compressed air or the like, and has a pipe 11 extending to and through the top of the tank 1, and thence down inwardly in the same, terminating in an outlet pipe or orifice 12 opening below the surface of the liquid in the tank 1. This compressed air may be permitted to enter the liquid in the tank 1, the flow of such compressed air being controlled by a valve 14 in said pipe 11. As an arrangement for supplying the tank 10 with compressed air I show an air pump 15 driven by some suitable device as for example an electric motor 16 and connected with the tank 10 by a pipe 17.

A filter 19 is preferably arranged at the opening of the spring 3 into the tank 1, whereby the spring water is filtered before entering the tank. The tank 1 is preferably provided with a door 20 conveniently located in its top whereby access may be had to its interior.

A pipe 21 leads from the tank 1 to a filtering tank 22 which is located some place conveniently near to the main reservoir tank 1. Charcoal 23 or other suitable filtering material may be located in this filtering tank 22, which thus forms a washing device. The pipe 21 is provided with a valve 24 for controlling the flow from the tank 1 to the filter 22. By this filter 22 the liquid passing from the tank 1 is filtered and purified.

Another tank 25 is provided convenient to the filter 22 and a connection 26 is arranged whereby liquid may flow from the filter 22 to the tank 25, said connection 26 having a check valve 27 to prevent a back flow from said tank 25. The latter is a reservoir or holding tank for the liquid or water received from the filter 22, said tank 25 being conveniently provided with a faucet 28 by which the liquid in the reservoir 25 may be drawn off from time to time as desired. Thus it will be seen that the liquid from the spring or from other source is first charged with radium emanation in the charging tank 1, and is then filtered in the filter 22 and then conveyed to the reservoir or holding tank 25 where it remains until drawn off as desired. If desired other material can be placed in the storage tank 25. For example, I have shown in said tank two tubes or receptacles 30 and 31, whereof the tube 30 preferably contains radium in some convenient form, preferably in some form other than ore, as for example radium bromid or the like. In the tube 31 I preferably place mesothorium. The substances or materials in these tubes, being incased or inclosed do not interfere at all with the purity of the liquid in the tank 25. But at the same time they add to the properties of said liquid, increasing the emanation therein.

I also show a tank 33 also containing liquid 34, which tank 33 is connected with the charging tank 1 by a pipe 35 opening from the top of the tank 1, and extending down well toward the bottom of the tank 33. This tank 33 is for washing or purifying the air coming from the tank 1 and so may be called a washing tank. Another pipe or tube 36 extends from the top of the tank 33 to about the bottom of the reservoir 25, whereby air from the tank 33 may pass to the bottom of the reservoir 25, and thence up through the liquid in said reservoir. Thus air with more or less emanation mixed with it after being purified in the washing tank 33, comes in contact with the cleaned and purified radio active water in the reservoir 25, thereby charging said air with emanation, the air thus charged occupying the upper portion of the reservoir 25. The air so located is also affected by the substances or materials in the tubes 30 and 31.

A treatment room 38 is also shown and a pipe connection 39 is shown extending from the top of the reservoir 25 into the interior of said room 38, whereby charged air may be led from the reservoir 25 into said treatment room or chamber. There is also shown a tank 40 having a pipe connection 41 with the pipe 39, said pipe 41 having a controlling valve 42. The tank 40 is preferably provided with oxygen whereby if desired oxygen may be added to the charged air passing from the reservoir 25 into the treatment chamber 38. The latter is in any suitable form or shape adapted to receive patients and allow them to remain in any desired position, inhaling the charged air. There is shown a small anteroom 43 and the door 44, by which patients may enter and be received prior to entering the main room 38. The reservoir 25 is provided with a door 25ᵃ in its top by which access can be had to its interior, permitting if desired the removal and replacement of the tubes 30 and 31. The tank 33 is preferably provided with a block 33ᵃ by which said tank may be opened, emptied and refilled. A water seal and check 46 is also shown, being in the form of a casing or vessel having a tube 47 whose ends extend into the liquid in the tank 1, and also into liquid in said vessel 46, so as to form a water seal and safety overflow, said vessel 46 having an opening 49 to permit an overflow escape of the liquid. The tank 1 is preferably provided with a gate or outlet 50 controlled by a valve 51 whereby said tank may be opened more or less as desired to permit the flow of spring water directly through the tank in the nature of a pipe pass arrangement.

It will thus be seen that the apparatus permits the treatment of patients by either the inhalation of charged air, in a treatment chamber 38, and also permits them to take and drink charged water from the reservoir 25. Thus the well known benefits of radium or other substance or material can be taken advantage of. It will be seen that in case radium is used in more or less the manner specified that a wide range of action and combination and adjustment is possible. The amount of radium and radium emanation employed may be varied as desired by varying the amount of ore 8 in the tank 1, and also by varying the quantity and nature of the materials in the tubes 30 and 31. Furthermore, the flow of the spring water may be varied as desired by controlling the valve 24, thus allowing the extent of charge to be varied and controlled. Further control may be obtained either by radium or other materials by means of the tubes 30 and 31, which obviously may be caused to contain different amounts as desired of different materials having different tendencies or properties. Furthermore, the apparatus is particularly adapted for use in connection with radium and the like, inasmuch as the continuously flowing spring water permits the continuous progression of the liquid and air in the apparatus and thereby permits the strength to be maintained to a more or less extent by avoiding weakening because of decay of the emanation through lapse of time. If radium ore such as mentioned is used in the tank 1, it is obvious that the charging effect in said tank becomes greater because of the formation of radium by said ore and it will also be noted that if the radium compounds or substances mentioned are used in the tubes 30 and 31 for example, there may be a weakening of the charging effect from said tube, but the same may be provided with new quantities of material to make up the loss if desired.

It will be understood that changes and modifications may be made without departing from the spirit of the invention.

What I claim is:

1. The combination of a tank provided with radio-active material and having an inlet connected to a flowing stream whereby liquid from said flowing stream may flow over said radio active material, said tank having an outlet by means of which liquid charged with emanation from said material may be withdrawn and also having an air space wherein air also may be charged from said material and also having an outlet for withdrawal of charged air.

2. Apparatus of the class specified, comprising a source of liquid supply, means for charging the same with radium or similar emanation, means whereby liquid so charged may be withdrawn for use, and means whereby air charged with emanation from said liquid may be withdrawn for use.

3. The combination with a source of liquid supply, of a charging tank provided with radio active material, means for automatically maintaining the liquid level in said tank at a predetermined height, and means whereby liquid charged by said radio active material may be withdrawn for use.

4. The combination with a source of liquid supply, of a charging tank provided with radio active material, means whereby liquid charged by said radio active material may be withdrawn for use, and means whereby air charged from said radio active material may also be withdrawn for use.

5. The combination of a tank provided with radio active material, a washing device for receiving liquid from said tank and washing the same, a reservoir for receiving liquid from said washing device and means for further charging liquid in said reservoir, said means comprising a tube or tubes containing radio active material.

6. The combination of a tank provided with radio active material, a washing device for receiving liquid from said tank and washing the same, a reservoir for receiving liquid from said washing device and means for further charging liquid in said reservoir, said means comprising tubes one of which contains radium and the other mesothorium.

7. The combination with a source of water supply, of a tank arranged to receive water from said source of supply and provided with means for charging the water therein with emanation, and a reservoir connected to receive water from said tank, said reservoir having an air space and an outlet pipe communicating with said air space.

8. The combination with a source of water supply, of a tank arranged to receive water from said source of supply and provided with radio active material, and a reservoir connected to receive water from said tank, said reservoir having an air space and an outlet pipe communicating with said air space, and a treatment chamber to which said pipe extends.

9. The combination with a source of water supply, of a tank arranged to receive water from said source of supply provided with radio active material, and a reservoir connected to receive water from said tank, said reservoir having an air space and an outlet pipe communicating with said air space, a treatment chamber to which said pipe extends, and a tank for containing oxygen or other gas to be supplied to said treatment chamber.

10. The combination with a source of liquid supply, of a tank for receiving liquid from said source, radio active material in said tank, said tank having an air space and an outlet for air from said space whereby air charged with emanation may be withdrawn, and a reservoir tank connected for receiving air from said tank, said reservoir tank also having an air space and a pipe connection therefrom to withdraw the charged air.

11. The combination with a source of liquid supply, of a tank for receiving liquid from said source, radio active material in said tank, said tank having an air space and an outlet for air from said space whereby air charged with emanation may be withdrawn, and a reservoir tank connected for receiving air from said tank, said reservoir tank also having an air space and a pipe connection therefrom to withdraw the charged air, said reservoir tank also being provided with radio active material.

12. A tank provided with radio active material and having an inlet connected to a flowing stream whereby liquid from said flowing stream may flow over said radio active material, said tank also having an air space wherein air may be charged from said material and also having an outlet for the withdrawal of charged air.

13. The combination of a tank located near a spring and having an inlet for the waters of the spring, and radio active material in said tank, said tank also having an outlet to permit the continuous flow of the spring waters through said tank and by said material, said tank also having an air space and an outlet for air charged by said material.

14. The combination of a tank provided with radio active material and having outlets for charged liquid and air, washing devices by which said charged liquid and air are purified, and outlets from said washing devices for the purified liquid and air.

15. The combination of a tank provided with radio active material and having outlets for charged liquid and air, washing devices by which said charged liquid and air are purified, and outlets from said washing devices for the purified liquid and air, and a reservoir into which said charged liquid and air are led, said reservoir being provided with service outlets for said liquid and air.

16. The combination of a tank provided with radio active material and having outlets for charged liquid and air, washing devices by which said charged liquid and air are purified, outlets from said washing devices for the purified liquid and air, and a reservoir into which said charged liquid and air are led, said reservoir being provided with service outlets for said liquid and air, said air outlet from the air washing device being led to nearly the bottom of said reservoir, whereby said charged air passes through said charged liquid.

In witness whereof I hereunto subscribe my name this 10th day of October, A. D. 1914.

JOHN R. PENNINGTON.

Witnesses:
 HAZEL A. JONES,
 A. LYDA JONES.